US012468114B2

(12) United States Patent
Sauvageot et al.

(10) Patent No.: US 12,468,114 B2
(45) Date of Patent: Nov. 11, 2025

(54) REFLECTIVE OPTICS PROVIDED WITH A COOLING SYSTEM

(71) Applicant: ISP SYSTEM, Vic en Bigorre (FR)

(72) Inventors: Paul Sauvageot, Vic en Bigorre (FR); Laurent Ropert, Vic en Bigorre (FR); Sebastien Theis, Vic en Bigorre (FR); Thibaut Fourcade, Vic en Bigorre (FR)

(73) Assignee: ISP SYSTEM, Vic en Bigorre (FR)

( * ) Notice: Subject to any disclaimer, the term of this patent is extended or adjusted under 35 U.S.C. 154(b) by 461 days.

(21) Appl. No.: 18/010,394

(22) PCT Filed: Jun. 10, 2021

(86) PCT No.: PCT/EP2021/065659
§ 371 (c)(1),
(2) Date: Dec. 14, 2022

(87) PCT Pub. No.: WO2021/254879
PCT Pub. Date: Dec. 23, 2021

(65) Prior Publication Data
US 2023/0296860 A1    Sep. 21, 2023

(30) Foreign Application Priority Data

Jun. 15, 2020   (FR) ...................................... 2006212

(51) Int. Cl.
*G02B 7/195*    (2021.01)
*G02B 7/18*     (2021.01)
*G02B 26/08*    (2006.01)

(52) U.S. Cl.
CPC ....... *G02B 7/1815* (2013.01); *G02B 26/0825* (2013.01)

(58) Field of Classification Search
CPC .... G02B 7/1815; G02B 26/0825; G02B 5/08; G02B 5/085; G02B 26/06; G02B 27/0068; G02B 7/181
See application file for complete search history.

(56) References Cited

U.S. PATENT DOCUMENTS 3,784,339 A * 1/1974 Springfeld ............ B29C 48/335
                                                     425/381.2
4,657,358 A    4/1987 Anthony et al.
(Continued)

OTHER PUBLICATIONS

Kyohoon Ahn, et al., " CVD SiC deformable mirror with monolithic cooling channels", Optics Express vol. 26, No. 8, (2018), pp. 9724-9739.

(Continued)

*Primary Examiner* — Euncha P Cherry
(74) *Attorney, Agent, or Firm* — Oliff PLC

(57) ABSTRACT

Reflective optics for transporting, transforming or correcting a light beam in particular of the laser type, including a mirror receiving the light beam, a primary cooling circuit formed by an intermediate chamber of thermally conductive fluid arranged against the mirror at the rear thereof, and a secondary cooling circuit formed by a thermal heat sink arranged against the intermediate chamber of thermally conductive fluid, the heat sink being either in the form of a cold mass cooled by convection or conduction, or in the form of a plate made from a material with good thermal conductivity, the heat sink having a size and a shape equivalent to those of the reflective optics.

13 Claims, 2 Drawing Sheets

(56) References Cited

U.S. PATENT DOCUMENTS

| | | | |
|---|---|---|---|
| 4,844,603 | A | 7/1989 | Eitel et al. |
| 10,359,603 | B1 | 7/2019 | Reardon |
| 2001/0008469 | A1 | 7/2001 | Bar et al. |
| 2010/0020423 | A1* | 1/2010 | Phillips ................. G02B 26/06 359/845 |

OTHER PUBLICATIONS

Young Cheol Lee et al., "A Cooled Deformable Bimorph Mirror for a High Power Laser", Journal of the Optical Society of Korea, vol. 10, No. 2, Jun. 2006, pp. 57-62.

Libor Mrna et al., "Deformable mirror for high power laser applications", The International Society for Optical Engineering, (2015), pp. 1-6.

B S Vinevich et al., "Cooled and uncooled single-channel deformable mirrors for industrial laser systems", Quantum Electronics 28 (4), (1998), pp. 366-369.

Zhengxiong Zhu et al., "Development of a unimorph deformable mirror with water cooling", Optics Express vol. 25, No. 24, (2017), pp. 29916-29926.

Jul. 26, 2021 International Search Report issued in International Patent Application No. PCT/EP2021/065659.

Jul. 26, 2021 Written Opinion issued in International Patent Application No. PCT/EP2021/065659.

\* cited by examiner

REFLECTIVE OPTICS PROVIDED WITH A COOLING SYSTEM

FIELD OF THE INVENTION

The technical field of the present invention is that of reflective optics used in light beam systems, in particular of the laser type, as well as their cooling means.

As is well known, it is necessary to use reflective optical structures to transport laser beams, transform their profile, focus them or modify or correct the wave front of said beam.

There are many different types of lasers, both in terms of power, emission mode or type of amplifying medium used.

When the laser is a high average power laser, the reflective optics used experience a strong accumulation of energy which results in heating. This is a problem because such heating leads to the deformation of the optics, which causes optical aberrations in the laser beam, as well as the degradation of the optics themselves. It is then necessary to replace them at a frequency that incurs a cost that is difficult for the user to bear.

Reflective optics therefore need to be cooled from the moment that natural cooling by convection with ambient air is no longer sufficient, which is the case when they are used in high average power lasers (typically 5 to 20 kW). This is all the more critical when the laser in question is in a vacuum, such as those used in scientific laboratories such as PetaWatt lasers with a high repetition rate, which deliver an average power of 10 kW or more, or continuous or pseudo-mode lasers used for example in the microelectronics industry with average powers of 1 to 30 kW. There are also applications in astronomy, in particular in the infrared range, and in space observation for large-aperture telescopes whose optical qualities can be degraded by the thermal input from the observed scene (earth, bright star).

PRIOR ART

Several cooling systems are known and used for cooling the reflective optics used in lasers.

For example, the article "CVD SiC deformable mirror with monolithic cooling channels" by Kyohoon Ahn et al., published in Optics Express Vol. 26, No. 8, in 2018, describes a cooling system for mirrors composed of channels in which water circulates, the channels being formed within the thickness of the mirror itself and the mirror being operated by piezo-electric actuators. This system therefore requires intervention on the mirror itself, which is always difficult to achieve.

The U.S. Pat. No. 4,657,358 describes a deformable mirror cooled by channels perpendicular to the mirror, each channel being included in the shaft of each actuator and forming a small circular chamber around the head of each actuator. It is thus a system formed by localised cooling points limiting the cooling effect.

The U.S. Pat. No. 4,844,603 describes a cooled flexible mirror having a cooling chamber between said mirror and its support, the cooling chamber being filled with cooling liquid.

The article "A cooled deformable bimorph mirror for a high power laser" by Jun Ho Lee, published in the Journal of the Optical Society of Korea, June 2006, describes a convection and conduction cooling system, the convection being provided by an oblique embossing included under the reflection surface and in which water circulated as the liquid coolant, the conduction being provided by a metal coating layer included in the embossing.

The article "Deformable mirror for high power laser applications" by Libor Mrňa et al., published in Proceedings of SPIE, the International Society of Optical Engineering, January 2015, describes a mirror deformable by actuators, cooled by a pressurised cooling liquid circulating along the back surface of the mirror through the hexagonal structure of said surface.

The article "Cooled and uncooled single-channel deformable mirrors for industrial laser systems" by B. S. Vinevich et al., published in Quantum Electronics, 1998, describes a skewed embossing system included in the mirror in which a cooling liquid circulates.

The article "Development of a unimorph deformable mirror with water cooling" by Zhengxiong Zhu et al., published in Optics Express, November 2017, describes a cooling system where the cooling liquid circulates through the rear side of the mirror in a cooling cavity. A cooling unit at the periphery of the mirror keeps the cooling liquid at a constant temperature of 20° C.

However, these different systems have shortcomings or disadvantages.

Indeed, the systems allowing the cooling of the mirrors with air or a cooling liquid on the rear side of the mirror at the periphery do not provide sufficiently effective cooling to be useful in the case of high average power lasers. These cooling systems create a temperature gradient on the active surface of the mirror which is detrimental to its optical quality.

As for the cooling systems using a liquid circulating on the rear side of the mirror, although they have an excellent thermal efficiency, the pulsations of the pumping of the cooling liquid cause the appearance of dynamic optical defects in the laser beam.

Lastly, the cooling systems that circulate a cooling liquid through a set of channels located either within the thickness of the mirror or against the rear side of the mirror, result in a decrease of the optical qualities of the mirror due to optical aberrations in the laser beam caused by the thermal footprint of the cooling channels. In addition, these systems are complex and expensive to manufacture.

DISCLOSURE OF THE INVENTION

The present invention proposes a cooling system for reflective optics used in observation devices, telescopes, high average power lasers and for optical devices sensitive to thermal effects, without having the disadvantages and limitations of the prior art.

The invention relates to reflective optics for transporting, transforming or correcting a light beam, in particular of the laser type, characterised in that it comprises a mirror receiving the light beam, a primary cooling circuit formed by an intermediate chamber of thermally conductive fluid arranged against the mirror at the rear thereof, and a secondary cooling circuit formed by a thermal heat sink arranged against the intermediate chamber of thermally conductive fluid, said heat sink being either in the form of a cold mass cooled by convection or conduction, or in the form of a plate made of a material with good thermal conductivity, the heat sink having a size and a shape equivalent to those of said reflective optics.

According to one embodiment of the invention, the plate forming the heat sink has within its thickness a channel in which a heat-transfer fluid is made to circulate.

According to another embodiment of the invention, the mirror is a deformable mirror fitted with actuators on its rear side, each actuator traversing the intermediate chamber of thermally conductive fluid and the heat sink through a hole.

Advantageously, each actuator is provided with a movable head in translation in a hole made in the heat sink, the thermally conductive fluid circulating in said hole around the movable head.

Also advantageously, the hole is closed by a sealing ring.

According to another embodiment of the invention, the channel integrated into the thermal heat sink is in the form of a spiral loop and has an inlet point and an exit point.

Advantageously, the inlet point of the heat transfer fluid in the channel is located near the centre of the heat sink.

Also advantageously, the exit point of the heat transfer fluid out of the channel is located in the vicinity of the periphery of the heat sink.

According to another embodiment of the invention, the mirror, the intermediate chamber of thermally conductive fluid and the thermal heat sink are associated mechanically to form an integral block.

According to another embodiment of the invention, the optics is fixed to the heat sink by means of supports.

According to another embodiment of the invention, the thermally conductive material forming the heat sink is made of metal, preferably copper.

According to another embodiment of the invention, the intermediate chamber of thermally conductive fluid is possibly in connection with an expansion tank.

For a lower average power, it may be appropriate to replace the block containing the channel with the coolant fluid by a cold mass cooled by natural or forced convection by means of fins formed the back of the cold plate for example and/or by conduction due to the thermal connection of the cold mass to the vacuum chamber, for example in the case of vacuum installation.

A first advantage of the cooling system according to the invention is that it can be adapted to fixed mirrors and deformable mirrors. It is sufficient to provide holes through the heat sink for the passage of actuators coming into contact with these deformable mirrors.

Another advantage of the invention lies in the fact that the cooling system can adapt to all shapes of mirror: flat, parabolic, rectangular, circular, etc.

A further advantage of the invention lies in the fact that the cooling system can adapt to a wide range of laser beam powers, whose cross-section can vary from a few square centimetres to more than 2500 cm².

A further advantage of the invention is that the cooling circuit is not in contact with the mirror itself. Thus, pressure fluctuations in the circuit do not affect the geometry of the mirror and therefore do not affect its optical function.

A further advantage of the invention is the low thermal resistance between the reflective face of the mirror and the heat sink, which allows very efficient cooling.

A further advantage of the invention is that the mirror can be made from a material with good optical properties (glass and glass or silicon derivative) with average thermal conductive properties.

A further advantage of the invention is that the static deformations of the mirror under the effect of gravity can be corrected by adjusting the pressure of the thermally conductive fluid in the cooling chamber and in the expansion tank.

A further advantage of the invention lies in the fact that the cooling system allows the exchange of heat to take place over almost the whole surface of the mirror.

A further advantage of the invention lies in the fact that the cooling system has two stages, the first stage being formed by the thermally conductive fluid in the cooling chamber and the second stage being formed by the heat-transfer fluid circulating in the cooling channel in the heat sink, the combination of the two stages producing an effective and uniform cooling effect.

A further advantage of the invention is that the heat sink is made of a thermally conductive material, its temperature is homogeneous and does not show thermal variations that could disturb the functioning of the reflective optics.

BRIEF DESCRIPTION OF THE DRAWINGS

Further features, advantages and details of the invention will be better understood by reading the following description with reference to the drawings in which.

DETAILED DESCRIPTION OF EMBODIMENTS OF THE INVENTION

The invention will now be described in more detail. As indicated above, the purpose it to cool a reflective optics in order to avoid deformation under the effect of heat in order to minimise the optical aberrations.

Figure 1:
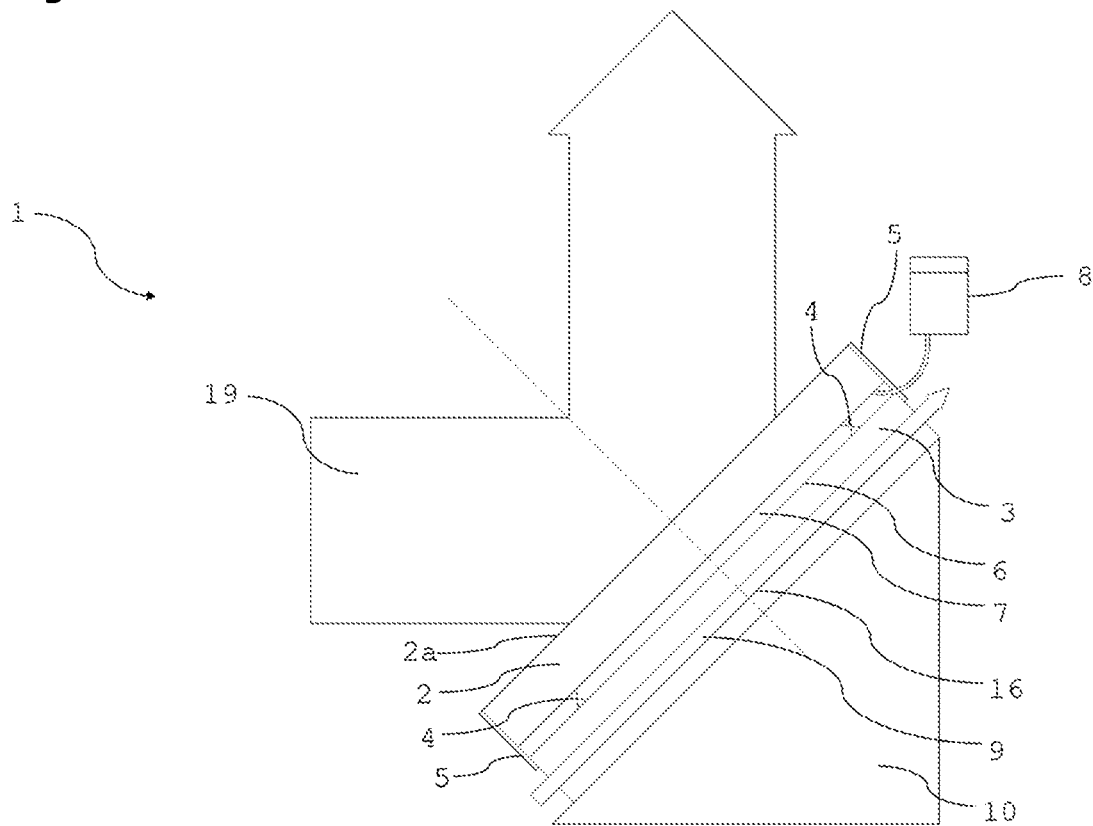
FIG. 1 shows rigid reflective optics equipped with the cooling system of the invention.

FIG. 1 shows a cross-section of reflective optics 1, incorporating a mirror 2, which in this version is a planar mirror 2a which reflects an incidental beam 19, for example of the laser type, to another optical path.

The mirror 2 is fixed to a heat sink 3 by means of supports 4. The supports 4 define, in cooperation with one or more sealing parts 5, an intermediate chamber 6, located between the mirror 2 and the heat sink 3. The supports 4 are preferably astatic supports which prevent the transmission of pressure fluctuations or movements between the heat sink 3 and the mirror 2 as well as between the intermediate chamber 6 and the mirror 2.

Figure 4:
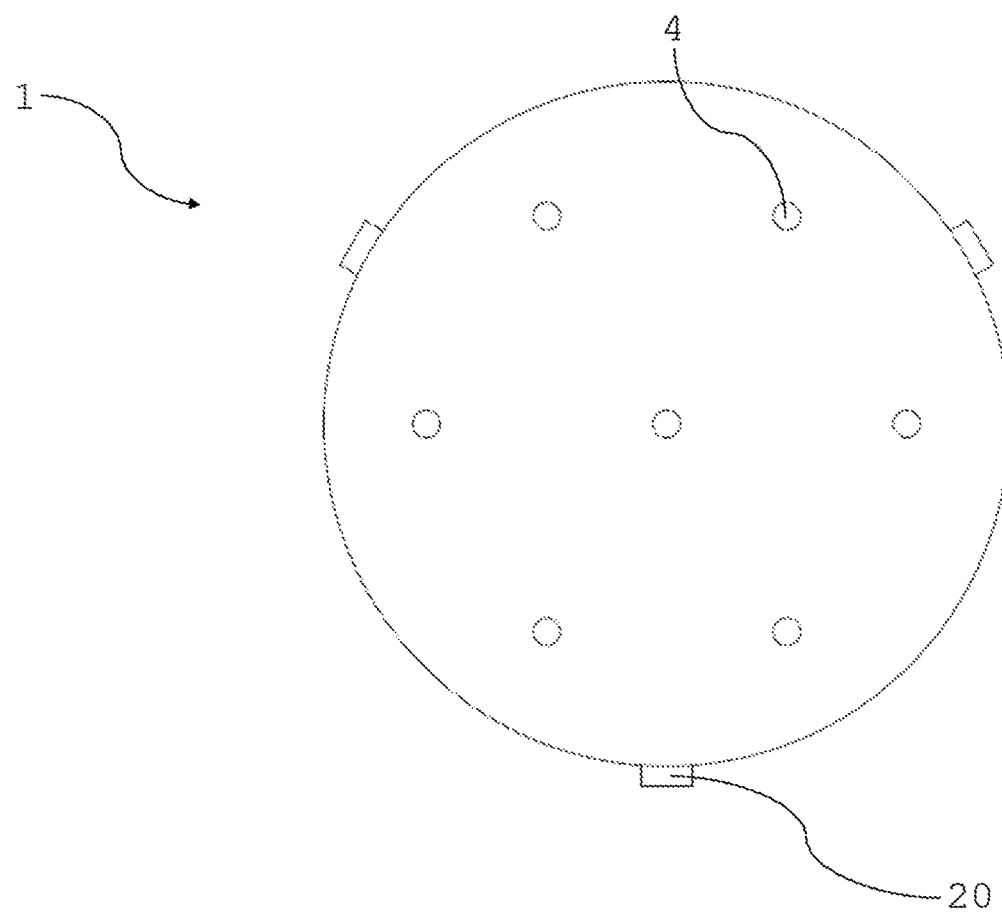
FIG. 4 shows a particular arrangement of the fixed supports.

Thus, in a configuration of ten supports, for example seven astatic supports 4 and three fixed supports 20 can be provided, as shown in FIG. 4. This chamber 6 is filled with a thermally conductive fluid 7. The intermediate chamber 6 communicates with an expansion tank 8 which allows the pressure of the thermally conductive fluid 7 to be adjusted in said chamber.

The heat sink 3 is a support block on which the mirror 2 rests. It has an internal structure which is perforated by a cooling channel 16 in which a heat-transfer fluid 9 circulates.

FIG. 1 shows that the heat sink 3 has a contact surface equal to that of the mirror. It goes without saying that this heat sink can have a different surface, either larger or smaller.

For a lower average power, it may be appropriate to replace the block comprising the channel 16 with the heat-transfer fluid 9 by a cold mass cooled by natural or forced convention by means of fins on the back of the cold plate for example and/or by conduction through the thermal connection of the cold mass to the vacuum chamber for example in the case of vacuum installation. It is advantageous that said cold mass has good thermal conductivity and good specific heat. Good thermal conductivity or good specific heat means values such as those provided by the copper.

The cooled cold mass may also be in the form of a metallic mass made of copper for example.

The reflective optics 1 and the heat sink 3 rest on a support 10 integrated into the laser assembly which is not shown.

Figure 2:
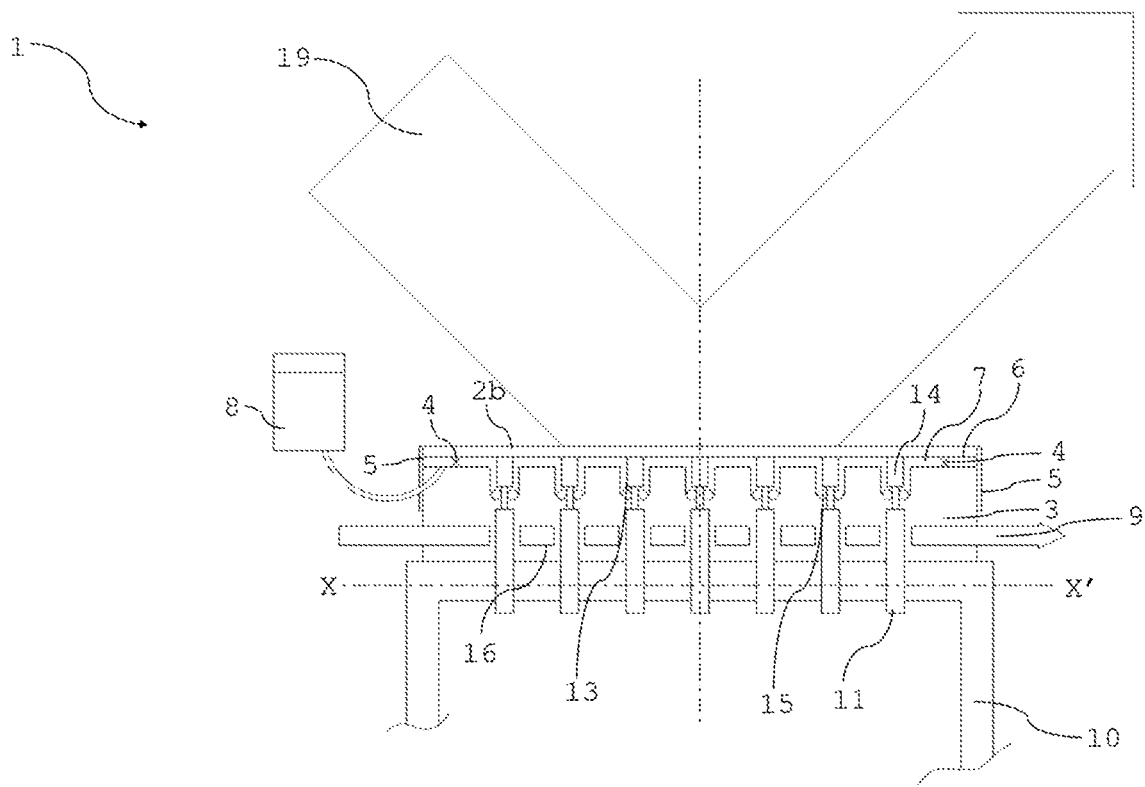
FIG. 2 shows deformable reflective optics equipped with the cooling system of the invention.

FIG. 2 shows a reflective optics 1 formed by a deformable mirror 2b associated with the cooling system according to the invention.

The actuators 11 are supported by the support 10. These actuators traverse the heat sink 3 and the intermediate chamber 6 to come into contact with the rear side of the mirror 2b by means of a mobile head 14. The structure of an actuator is well known and it is not necessary to describe it in more detail.

The heat sink 3 is provided with holes 13 allowing the passage of the actuators 11 with a certain amount of clearance. Each hole 13 is closed with a sealing ring 15 to ensure that the thermally conductive fluid 7 is maintained in the intermediate chamber 6.

As in the case of fixed reflective optics, FIG. 2 shows a mirror 2 behind which an intermediate chamber 6 filled with a thermally conductive liquid 7 opens. The mirror 2 rests on the heat sink 3 by means of supports 4.

One or more sealing parts 5 border the intermediate chamber 6. As before, the heat sink 3 includes a channel for the circulation of a heat-transfer fluid 9.

It is understood that the assembly described in relation to FIGS. 1 and 2 makes it possible to distribute the heat over the whole of the rear side of the mirror 2a or 2b by means of the intermediate chamber 6 avoiding any temperature gradient. As the temperature increases, the heat transmitted by the mirror 2a or 2b causes the liquid 7 to circulate in the chamber 6 and the expansion tank 8. On the other hand, the chamber 6 makes it possible to reduce the deformations of the mirror 2a or 2b due to the hydraulic inertia of the liquid 7.

The intermediate chamber 6 and expansion tank 8 assembly makes it possible to compensate for and control the deformations of the mirror 2. By modifying the altitude of the expansion tank 8 in relation to the intermediate chamber 6, the resistance of the intermediate chamber 6 to the deformations of the mirror 2 is varied. The heat received by the mirror 2a or 2b is evenly distributed by the absence of hot spots.

Thus, the removal of heat received by the mirror 2a or 2b is ensured by means of the heat sink 3 in which the heat-transfer fluid 9 circulates.

When the laser beam 19 is a high average power beam, the mirror 2 receives a high energy charge which increases its temperature. This thermal charge is communicated to the thermally conductive fluid 7 then to the heat sink 3 for the purpose of diffusion and a uniform distribution of the heat flow allowing cooling according to a first stage.

This first diffusion stage is followed by a second stage in which the heat sink 3 is cooled in turn by the heat-transfer fluid 9 which circulates in the channel 16 formed in the heat sink 3.

This is a two-stage cooling system. This system allows effective and uniform cooling of the reflective optics into which it is integrated.

Figure 3:
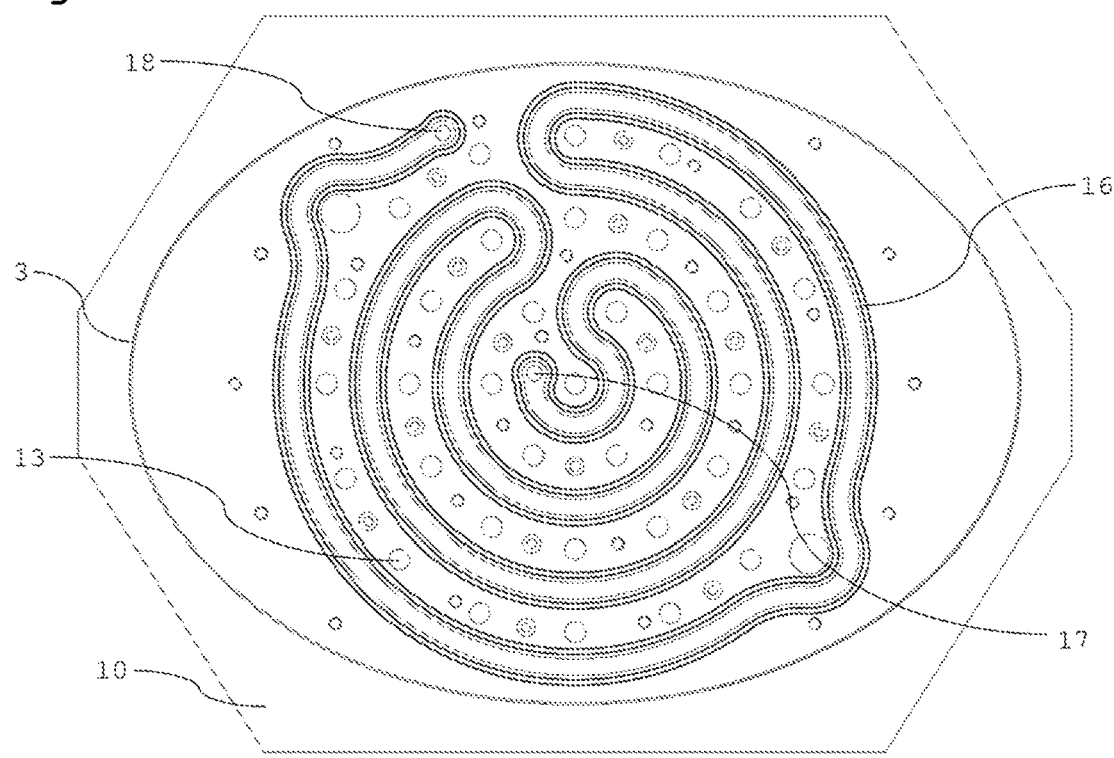
FIG. 3 shows a cross-section of the heat sink of FIG. 2 along the X-X' axis.

FIG. 3 shows a cross-section of the heat sink 3 along the X-X' axis in its thickness at the level of the channel 16. It can be seen that the channel 16 describes a path delimiting a certain number of loops close to one another. Thus, the mirror 2a or 2b can be cooled uniformly over its entire surface.

The channel 16 runs along almost all of the surface of the heat sink 3 with the inlet point 17 of the fluid being cleverly located in its central area and the exit point 18 of fluid located at the periphery. Of course, this is the preferred configuration, but any other configuration can be adopted according to the shape and dimensions of the mirror and the energy it receives.

The through holes 13 for the actuators are distributed over the whole surface of the heat sink between the different loops.

The mirror 2 may be polished. It may also be coated or not coated with a treatment for reflecting the laser beam. The reflecting treatment may be a coating applied to the optics of a metal or dielectric type or a combination of both, making it possible to achieve a reflectivity of 99% or more.

Alternatively, the mirror is made from a thermally conductive material, for example a metal that is easy to polish, such as copper or silicon. It is also possible to use a silica-based substrate to obtain optimal optical qualities, but the cooling capacity will be lower.

The thermally conductive fluid 7 can be for example Galinstan and the coolant fluid 9 can be water.

The invention claimed is:

1. Reflective optics for transporting, transforming or correcting a light beam, the reflective options comprising:
   a mirror receiving the light beam;
   a primary cooling circuit formed by an intermediate chamber of thermally conductive fluid arranged against a whole rear side of the mirror; and
   a secondary cooling circuit formed by a thermal heat sink arranged against the intermediate chamber of thermally conductive fluid, the heat sink being either in the form of a cold mass cooled by convection or conduction, or in the form of a plate made from a material with good thermal conductivity, the heat sink having a size and a shape equivalent to those of the reflective optics.

2. The reflective optics according to claim 1, wherein the plate forming the heat sink has within its thickness a channel in which a heat-transfer fluid is made to circulate.

3. The reflective optics according to claim 1, wherein the mirror is a deformable mirror fitted with actuators on its rear side, each actuator traversing the intermediate chamber of thermally conductive fluid and the heat sink through a hole.

4. The reflective optics according to claim 3, wherein each actuator is provided with a movable head in translation in a hole made in the heat sink, the thermally conductive fluid circulating in the hole around the movable head.

5. The reflective optics according to claim 4, wherein the hole is closed by a sealing ring.

6. The reflective optics according to claim 2, wherein the channel integrated into the thermal heat sink is in the form of a spiral loop running over the heat sink surface and having an inlet point and an exit point.

7. The reflective optics according to claim 6, wherein inlet point of the heat-transfer fluid into the channel is located near the centre of the heat sink.

8. The reflective optics according to claim 6, wherein the exit point of the heat-transfer fluid from the channel is located in the vicinity of the periphery of the heat sink.

9. The reflective optics according to claim 1, wherein the mirror, the intermediate chamber of thermally conductive fluid and the thermal heat sink are associated mechanically to form an integral block.

10. The reflective optics according to claim 1, wherein the optics is fixed to the heat sink by means of supports.

11. The reflective optics according to claim 1, wherein the thermally conductive material forming the heat sink is made of metal.

12. The reflective optics according to claim 1, wherein the intermediate chamber of thermally conductive fluid is possibly in connection with an expansion tank.

13. The reflective optics according to claim 1, further comprising a sealing part that borders both a side of the mirror and a side of the intermediate chamber.

* * * * *